Feb. 24, 1970     E. P. BERNARDI     3,496,908
AUTOMATIC VEHICLE CLEANSING DEVICE
Filed May 15, 1967     6 Sheets-Sheet 3
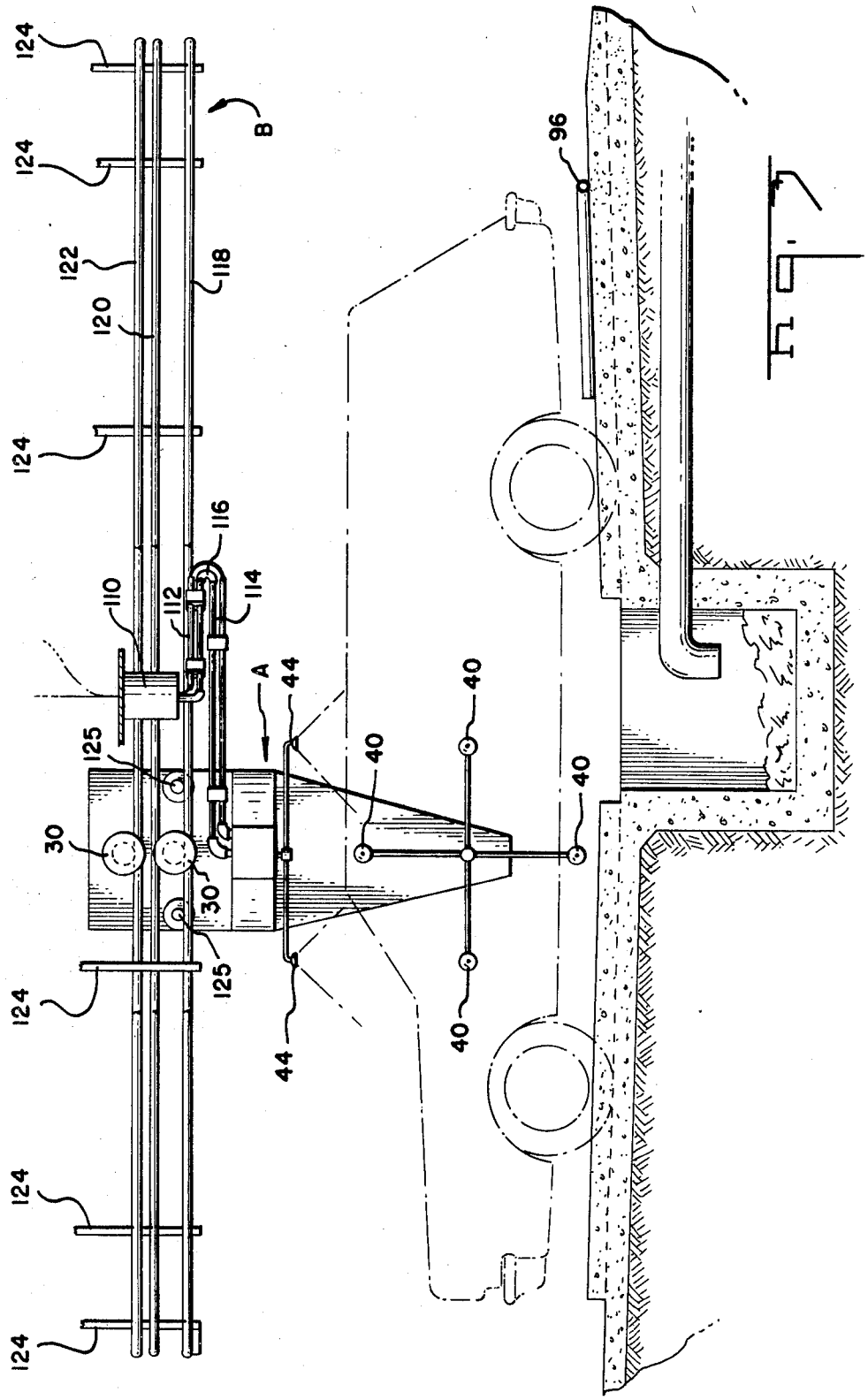

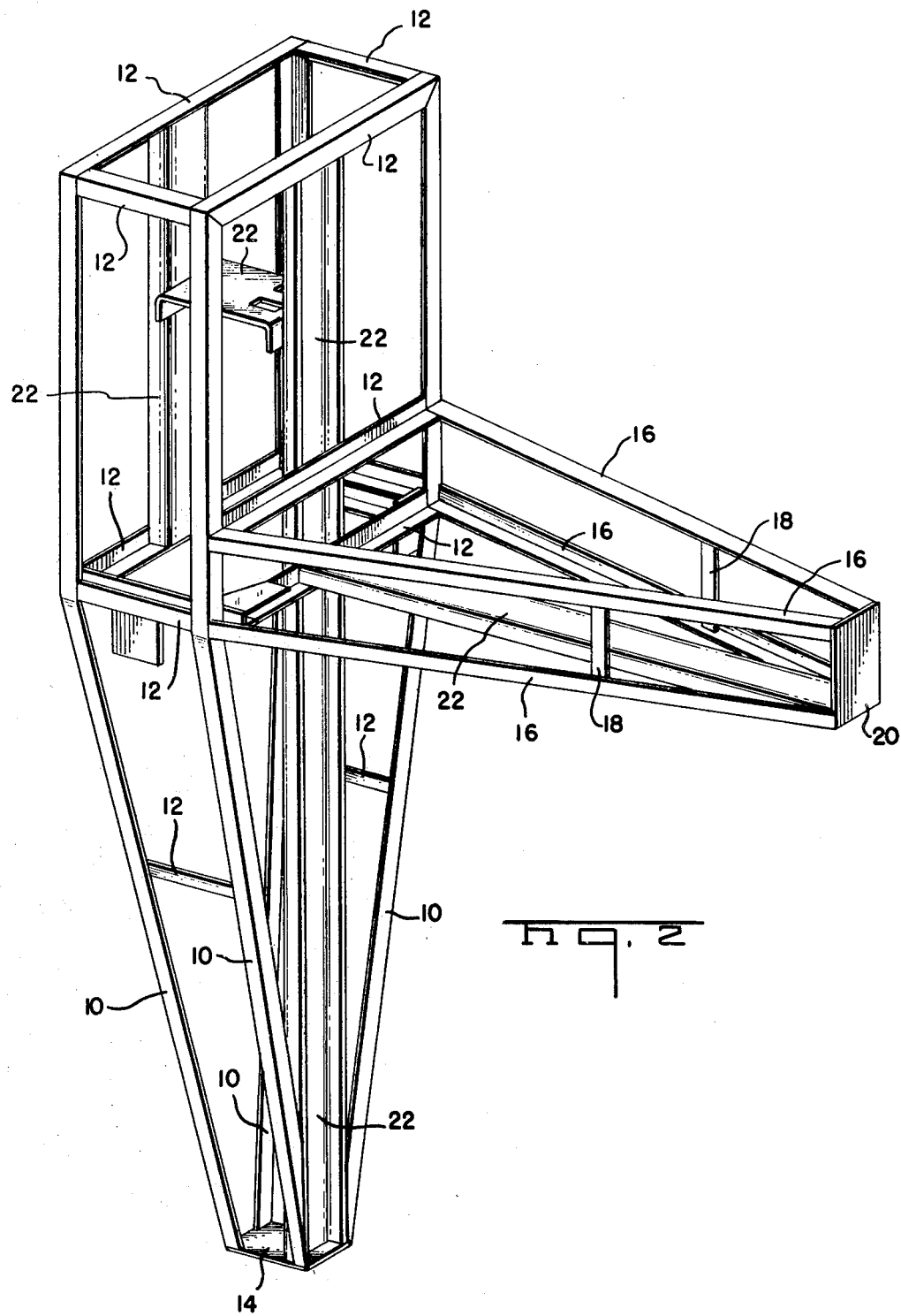

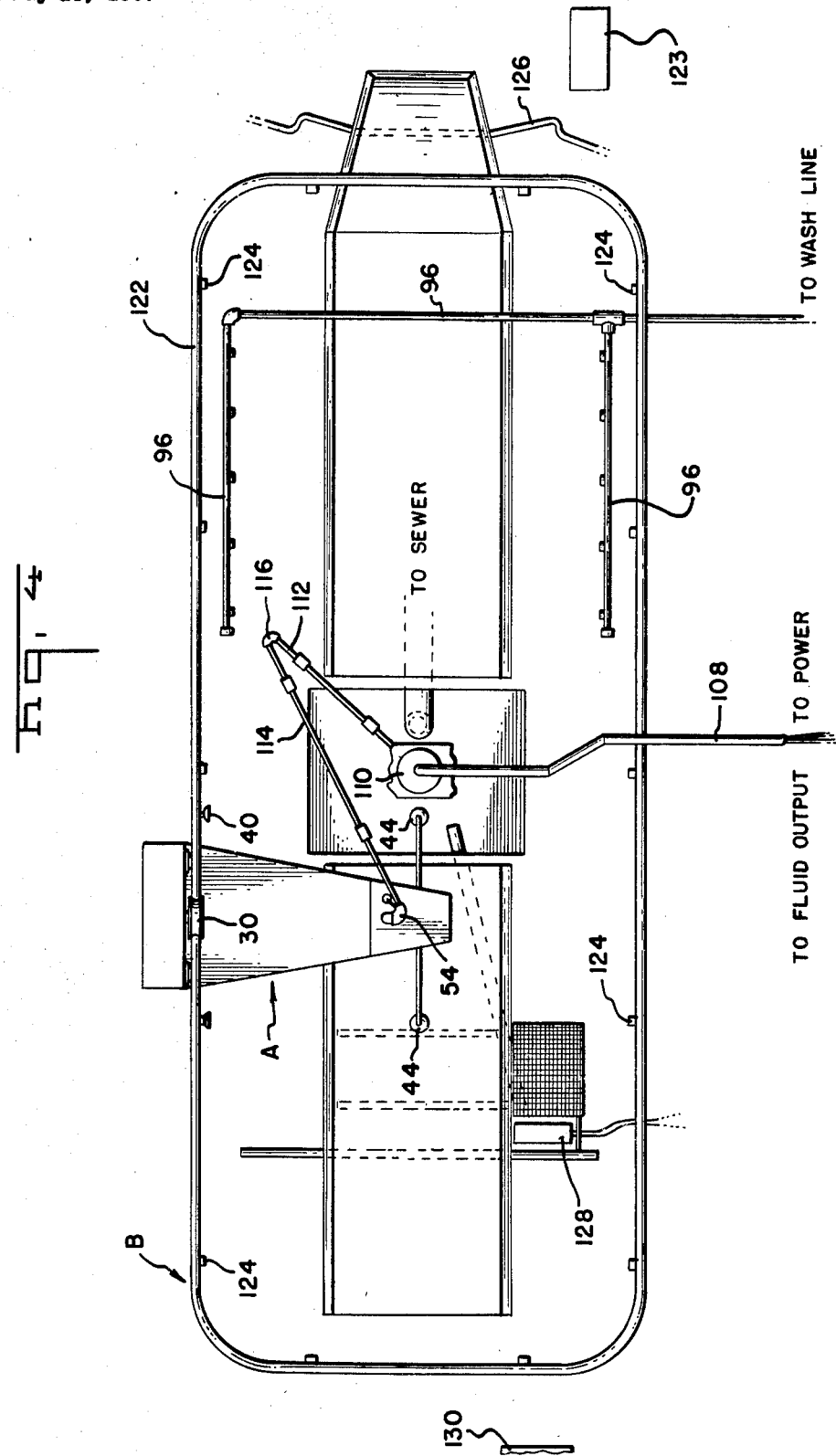

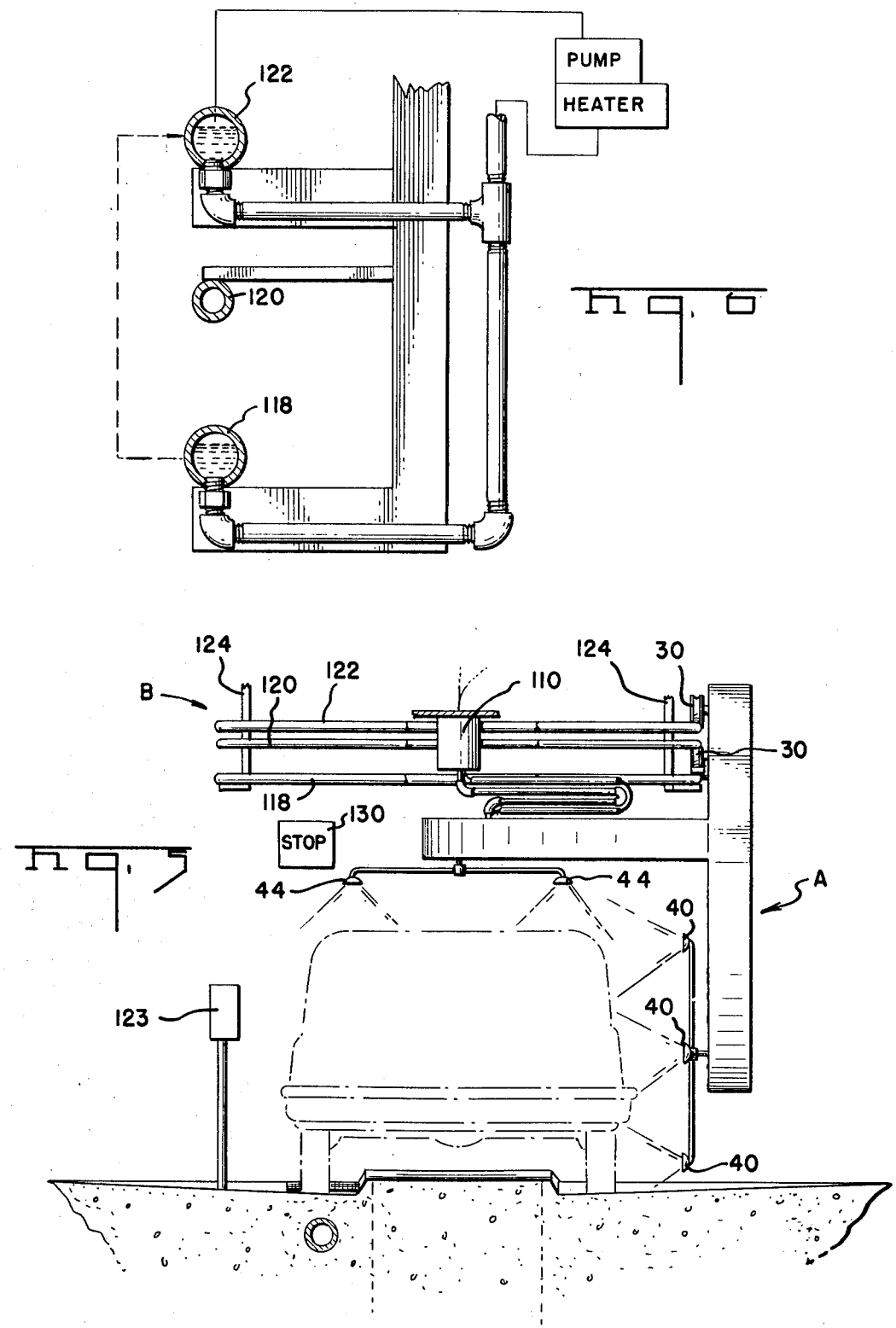

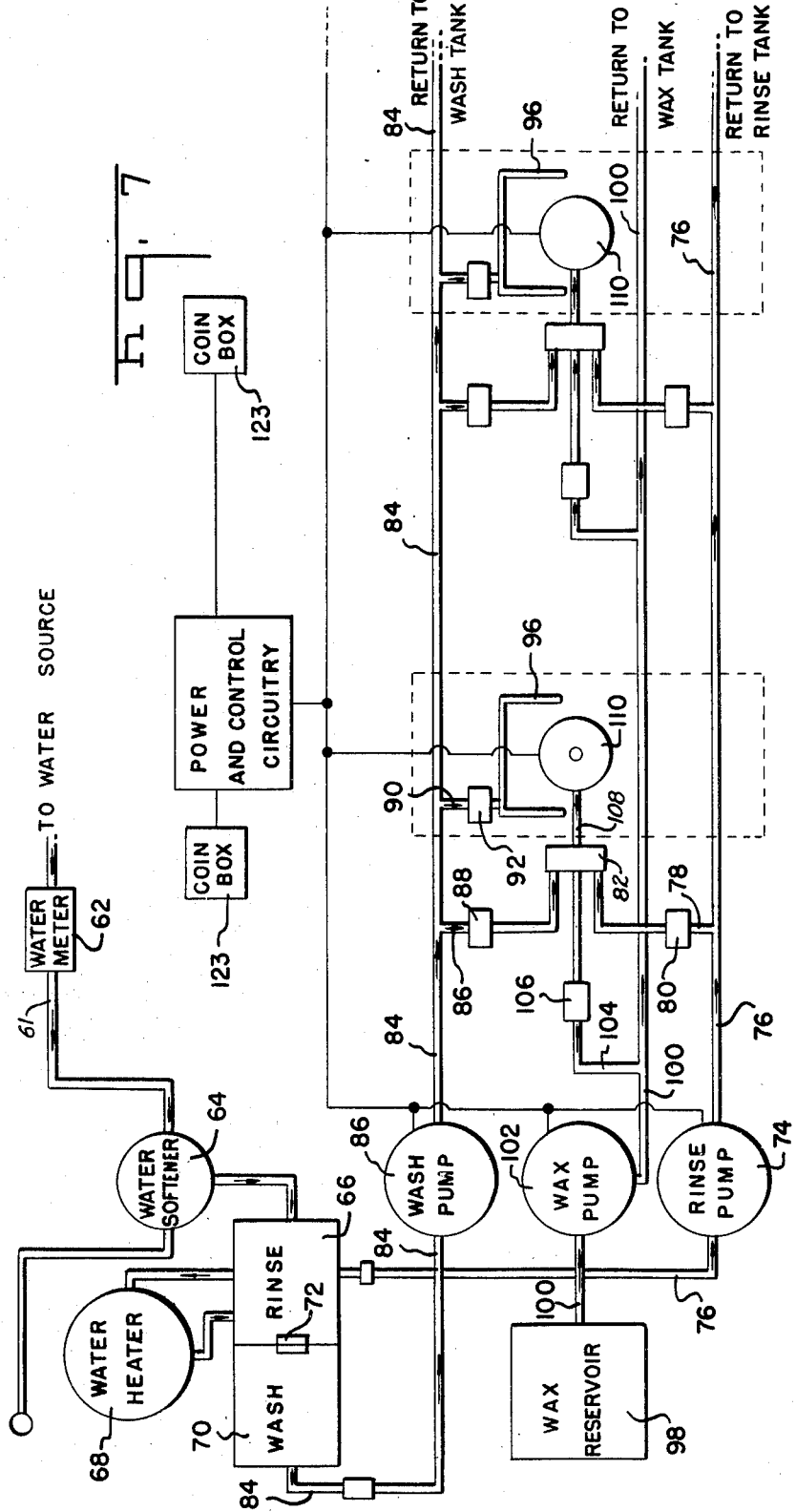

United States Patent Office 3,496,908
Patented Feb. 24, 1970

3,496,908
AUTOMATIC VEHICLE CLEANSING DEVICE
Eugene P. Bernardi, Cider Press Road,
Harrisburg, Pa. 17111
Filed May 15, 1967, Ser. No. 638,399
Int. Cl. B05c 11/00
U.S. Cl. 118—2                                9 Claims

ABSTRACT OF THE DISCLOSURE

The disclosure relates to a coin-operated device for cleaning vehicles. After the proper combination of coins is inserted, the vehicle is centered within the device. A preliminary spray washes the lower part of the vehicle. Then the cleaning member directs a high pressure spray onto the vehicle. The cleaning member circles the vehicle four times, twice during a washing cycle and twice during a rinse cycle, with an optional wax cycle included in the first rinse cycle.

SUMMARY OF THE INVENTION

The invention comprises a completely automatic device for cleaning a vehicle by application for a high pressure, rotary spray applied to the surface of the vehicle. A motor located in the cleaning member drives the member around a track as well as rotating the nozzles.

IN THE DRAWINGS

FIG. 2 is a view similar to FIG. 1, illustrating the frame of the body member;

FIG. 3 is a side plan view of the body member and track;

FIG. 4 is a top plan view of the body member and track;

FIG. 5 is an end plan view of the body member and track;

FIG. 6 is a fragmentary view of the track member; and

FIG. 7 is a schematic view of the operation of the device.

Figure 1:
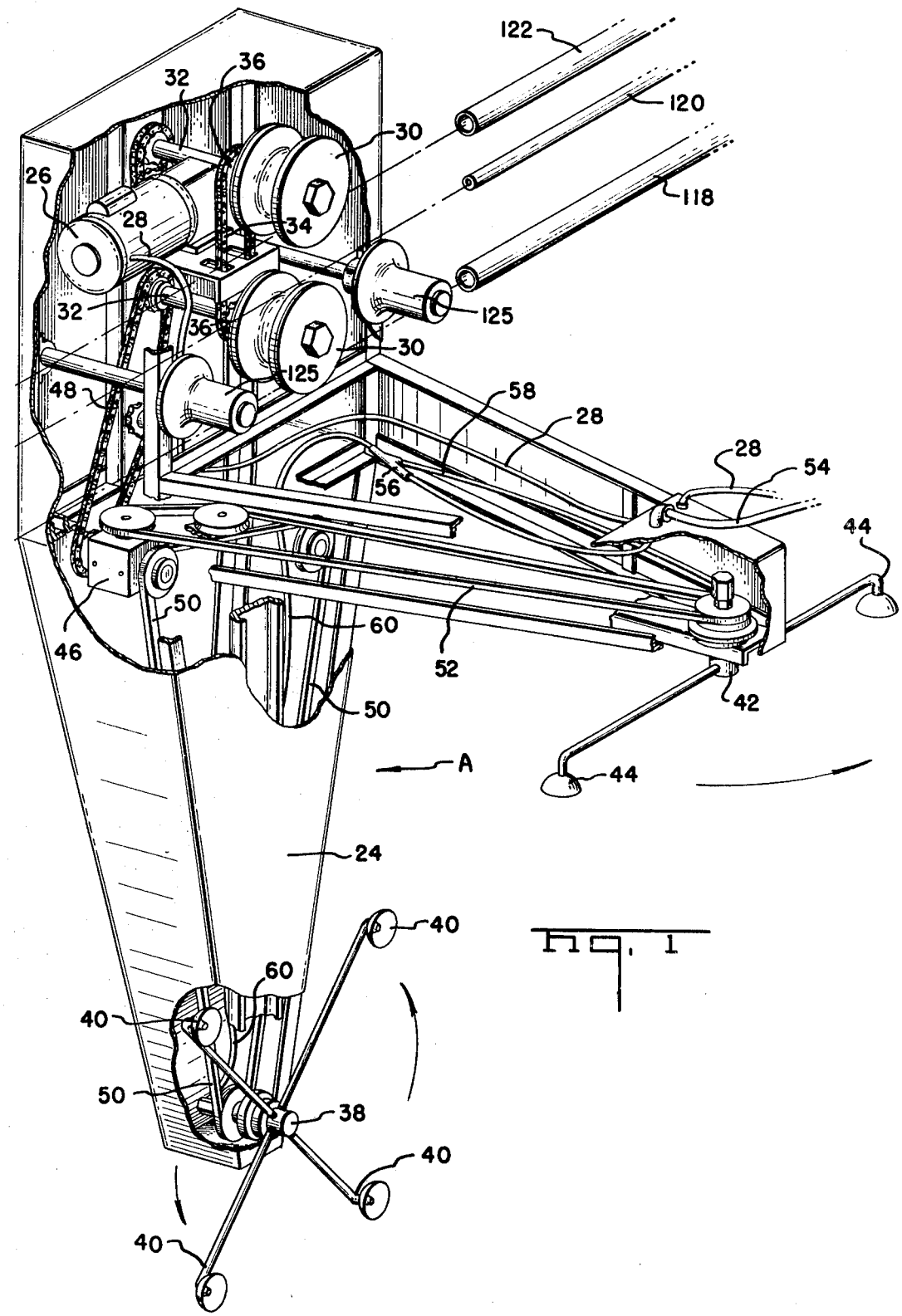
FIG. 1 is a perspective view of the body member, partially broken away.

Generally speaking, the device may be considered to be comprised of a body member A (FIG. 3), the track system B and the fluid system C (FIG. 7).

The body member A is comprised of a plurality of struts 10 (FIG. 2) held together by cross braces 12 and a plate 14 at one end to form a skeletal structure. A second plurality of struts 16 extend laterally from the first set of struts, with cross braces 18 and end plate 20, completing the framework. It also includes strengthening braces 22. The body member is encased in sheet metal 24 (FIG. 1).

An electric motor 26 is mounted in the body member A (FIG. 1) and a lead 28 connects the motor to a power source.

A pair of rotatable rollers 30 are mounted on shafts 32. The rollers 30 are connected to the motor 26 by chain 34 and sprockets 36 so that the motor 26 drives the rollers.

A rotatable swivel 38 is mounted on the lower part of the body member with four spray arms 40 secured thereto. A similar swivel 42 with a pair of spray arms 44 is rotatably mounted within the lateral struts.

A reducer 46 mounted in the body member is connected to motor 26 by chain 48. A pulley and belt system 50 between the reducer and the swivel 38 causes the arms 40 to be rotated by the motor 26. A similar pulley and belt drive mechanism 52 connects the reducer 46 to the swivel 42 to cause the motor 26 to rotate the spray arms 44.

A fluid line 54 is secured to the body member A to provide fluid to the swivels 38, 42 during the operative cycle. The line 54 enters a tap 56. One line 58 comes out of the tap 56 and goes to the swivel 42. The other line 60 goes to the other swivel 38.

The system for supplying fluid to the body member is best shown in the schematic diagram of FIG. 7. A water supply line 61 furnishes water to a meter 62, then to a water softener 64 and into a rinse tank 66. A wash tank 70, with a supply of detergent is connected to the rinse tank 66 with a one way valve 72 that permits water to flow from the rinse tank to the wash tank. A rinse pump 74 is connected to the rinse tank 66 through fluid line 76. The rinse line 76 emerges from the rinse pump 74 carrying clear water to as many body member spraying devices as proprietor desires to install (while two are illustrated only one will be described since they are identical).

The rinse line 76 has a branch line 78, going to each unit. The line is controlled by a solenoid valve 80. It is fed into a distribution junction 82.

The wash reservoir 70 also has a fluid line 84 going to a wash pump 86. It comes out of the wash pump 86 to operate as a supply line for a plurality of units and then returns to the wash reservoir 70. A branch line 86 comes off the wash line 84, and goes through a solenoid valve 88 and into junction 82. A second branch line 90 also comes off the wash line 84, through a solenoid valve 92 and into a U-shaped spray member 96 located in floor of the area where the vehicle is to be washed (also see FIG. 3).

A reservoir 98 containing liquid wax (FIG. 7) is also included in the system. A wax line 100 goes into a wax pump 102, and then comes out of the pump to supply wax under pressure to the various units and then recirculates into the wax reservoir. A branch line 104 goes into a solenoid valve 106, and then into the junction 82.

A line 108 comes out of the junction 82 and into a swivel head 110. As is illustrated in FIGS 3 and 4, the swivel head 110 is connected to a pair of conduits 112 which pivot relative to a second pair of conduits 114 by an elbow joint 116. The fluid lines are encased within the conduit 112 (see FIG. 4), and the electrical lines encased within the conduit 114.

The endless track (FIG. 3) comprises three parallel sections 118, 120 and 122 secured to support members 124 which in turn are secured to the roof of the structure housing the device. The tracks are generally rectangular (see FIG. 4) with curved sections replacing the four corners. The track is designed so that it is slightly larger than the perimeter of the largest vehicle (as seen in top view plan) that it will accommodate.

The track, FIG. 1, is made of circular pipe with the lower track 118 and the upper track 122 adapted to receive the rollers 30, so that the groove in each roller rests on the upper surface of the respective track. The middle track 120 is positioned on top of the groove in the lower roller to act as a guide thereby preventing the body member tilting toward or away from the vehicle. A pair of rotatable guide rollers 124 are pivotally conected to the body member A on each side of the lower roller 30 to prevent the body member from tilting in a horizontal plane.

As shown in FIG. 6, the pipes 118 and 122 are connected to a system whereby heating fluid is circulated through the pipes. This system is separate from the wash and rinse system. It is used in cold weather to prevent ice from forming on the track which might cause slippage of the drive rollers.

OPERATION

The cycle is initiated by depositing the correct combination of coins in the coin box 123 (FIG. 4). This actuates the power and control circuitry. (This circuitry is standard electrical design and is not described herein.) The vehicle is then driven over a treadle switch 126 (FIG. 4) which operates solenoid valve 92 and starts the wash pump 86, so that fluid from the wash line 84 is pumped through the U-shaped spray 96 to cleanse the lower part of the vehicle.

The vehicle is then driven onto switch 128 (FIG. 4) to initiate the wash cycle. When the vehicle is properly positioned, a lighted sign 130 will be turned on, advising the driver to stop the car.

The wash cycle is then turned on and the electric motor drives the body member. The rotating swivels spray the wash water on the vehicle while the body member circles the vehicle twice. A timing relay cuts off the wash cycle and the rinse cycle is turned on. Again the body member circles the vehicle twice and the swivels cause rinse water to clean the vehicle. The wax cycle is optional, so that if the driver of the car desires wax he inserts an extra coin in the coin box. If he elects to use the wax, it is injected into the rinse water during the first half of the rinse cycle so that there is wax in the rinse water the first time the body member circles the vehicle during the rinse cycle. Otherwise, the body member will circle the vehicle twice, dispensing only rinse water. After the rinse cycle is completed the device is turned off and the vehicle is driven away from the unit.

It is obvious that a plurality of vehicle washing devices may be operated off the same washing, waxing, and rinsing equipment. Also, non-automatic devices can be incorporated into the same system, along with the automatic devices, without the need for additional fluid supply equipment.

Proper sewage facilities are included (FIG. 3) for draining waste water. Also in cold weather, the rinse water is continuously heated and re-circulated to prevent freezing of the system.

What I claim is:
1. An automatic vehicle cleansing device comprising a fluid supply means,
    pump means for delivering fluid from said fluid supply means,
    a body member fluidly connected to said pump means for delivering fluid from the pump means onto a vehicle to be cleansed,
    track means supporting said body member,
    driving means driving said body member along said track means,
    said track means including pipe means for receiving a fluid, and
    pump and heater means pumping a heated fluid through said pipe means to preclude formation of ice on said endless track.

2. The device of claim 1 wherein said fluid supply means includes a return line for re-circulating unused fluid.

3. The device of claim 1 including a wash tank and pump means for introducing detergent into the fluid during a predetermined portion of the cycle.

4. The device of claim 3 including a wax tank and pump means for introducing a wax into the fluid during a predetermined portion of the cycle.

5. The device of claim 1 wherein said fluid supply means includes a water rinse tank, a water heater for said rinse tank, and a return line for said rinse water tank whereby rinse water may be continuously heated and recirculated to prevent freezing of the system during cold weather.

6. The device of claim 1 wherein said track means includes an endless track and wherein said drive means includes an electric motor operatively connected to roller means rotably mounted on said body member and tractionally engaging said endless track.

7. The device of claim 6 wherein rotating spray swivels are mounted on said body member for impinging the fluid onto the vehicle to be cleansed and wherein a linkage between said electric motor and said spray swivels causes rotation of said spray swivels.

8. The device of claim 6 including means for preventing operation of the device until a vehicle is properly centered within planar profile of the endless track.

9. The device of claim 6 including a plurality of endless tracks, each having a body member supported thereon, all operable from the same pump means and a fluid return line to the pump means.

References Cited

UNITED STATES PATENTS

| | | | |
|---|---|---|---|
| 2,661,310 | 12/1953 | Page et al. | 118—316 X |
| 2,910,993 | 11/1959 | Phillips | 134—123 |
| 3,167,797 | 2/1965 | Hergonson | 134—123 X |
| 3,259,138 | 7/1966 | Heinicke. | |
| 3,339,565 | 9/1967 | Williams | 134—123 X |

OTHER REFERENCES

Auto Laundry News, November 1965, page 38.

WALTER A. SCHEEL, Primary Examiner

J. P. McINTOSH, Assistant Examiner

U.S. Cl. X.R.

118—73, 323; 134—123; 239—135, 185

UNITED STATES PATENT OFFICE
CERTIFICATE OF CORRECTION

Patent No. 3,496,908      Dated February 24, 1970

Inventor(s) Eugene P. Bernardi

It is certified that error appears in the above-identified patent and that said Letters Patent are hereby corrected as shown below:

In column 3 last line, the entire line reading "endless track." should read -- track means. --

SIGNED AND
SEALED
SEP 15 1970

(SEAL)
Attest:

Edward M. Fletcher, Jr.
Attesting Officer

WILLIAM E. SCHUYLER, JR.
Commissioner of Patents